No. 741,909. PATENTED OCT. 20, 1903.
J. VOM HOFE.
FISHING REEL.
APPLICATION FILED APR. 21, 1903.
NO MODEL.
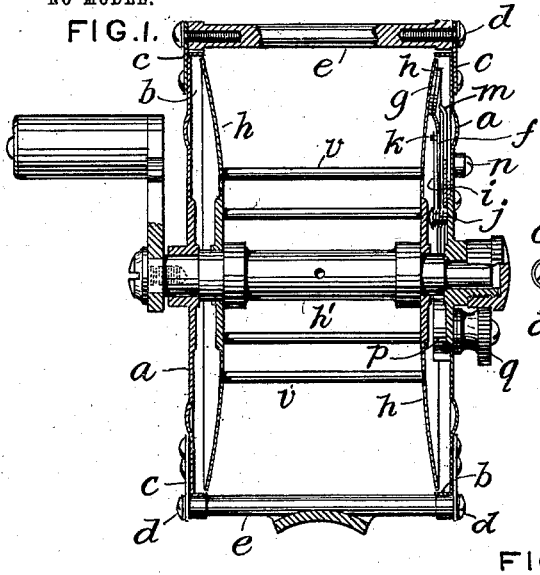
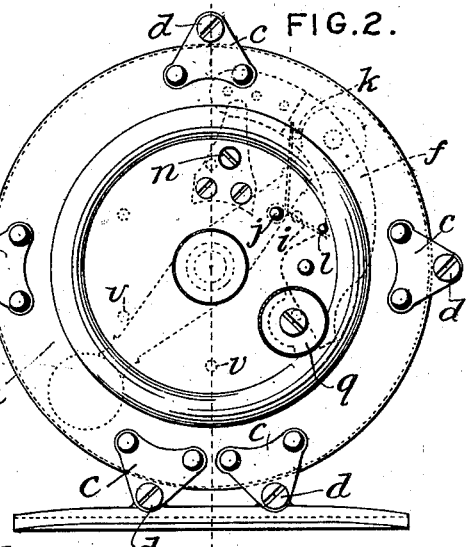
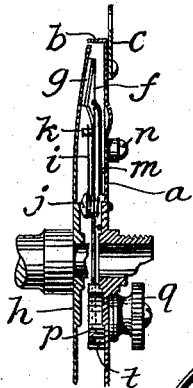
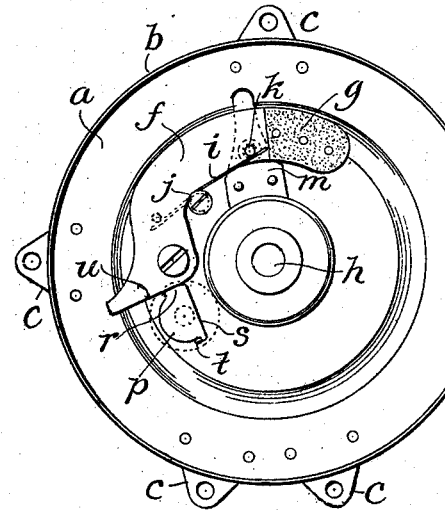
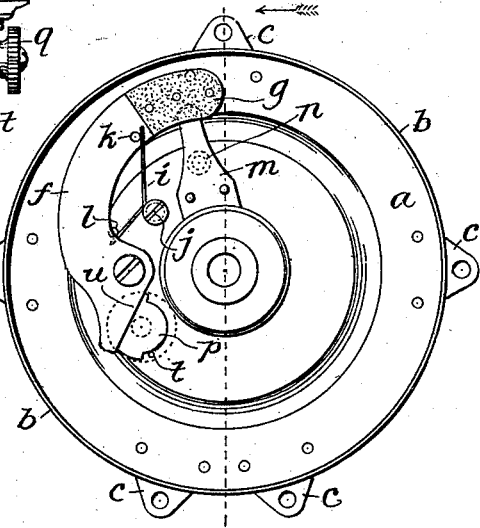
Witnesses
Julius Vom Hofe Inventor
By his Attorney Henry P. Wells No. 741,909. Patented October 20, 1903.

UNITED STATES PATENT OFFICE.

JULIUS VOM HOFE, OF NEW YORK, N. Y.

FISHING-REEL.

SPECIFICATION forming part of Letters Patent No. 741,909, dated October 20, 1903.

Application filed April 21, 1903. Serial No. 153,677. (No model.)

*To all whom it may concern:*

Be it known that I, JULIUS VOM HOFE, a citizen of the United States, residing in the borough of Brooklyn, city of New York, State of New York, have invented certain new and useful Improvements in Fishing-Reels, of which the following is a specification.

This invention comprises improvements in the combination, construction, and connection of the parts, as hereinafter described.

The reel is particularly adapted for salt-water fishing, as for tarpon, tuna, striped bass, &c. It can easily be made to fit either a heavy or light rod, working equally well on either.

My object is to provide not only a strong and light reel, but also to furnish to that class of anglers who are obliged to economize a reel of small cost that will equal in performance and durability the relatively expensive reels now on the market. My improved reel is in all respects equal in practical performance to reels costing at retail from thirty to fifty dollars or more, and it can be retailed at about one-fifth of that amount.

In the accompanying drawings, Figure 1 is a longitudinal section; Fig. 2, an end elevation; Fig. 3, an elevation of the inner face of the side plate that carries the drag, showing the latter out of action; Fig. 4, a like view with the drag in operative position; and Fig. 5, a detail transverse section through one of the side plates and spool-flanges, showing the drag located between them.

To make the reel cheap in construction, light, yet strong, durable, and satisfactory in operation, it is constructed as follows:

The side plates $a$ are each struck or spun up from sheet metal with an internally-projecting annular peripheral flange $b$. Lugs or earpieces $c$ are then riveted to the side plates, each being, preferably, of triangular shape and secured by two rivets. The corners projecting radially beyond the peripheries of the side plates are apertured to receive screws $d$, that pass into the spacing or brace rods $e$. The parts are so assembled that these rods bear upon or lie so closely contiguous to the peripheral faces of the flanges $b$ that no space is left for the entrance of the line, which otherwise might under some circumstances be caught between the flanged edges of the side plates and the rods. In the construction herein shown the edges of the spool-flanges are so covered and protected by the peripheral flanges of the side plates that the line cannot possibly be caught between them, which should it occur would lock the spool against rotation in either direction, and with a fair-sized fish on the line it would be broken by the sudden strain. Experience has demonstrated that by constructing the reel in this way it possesses all the advantages above recited and that it may be manufactured with such economy as to be sold for but a small part of the price at which reels of like size, but of ordinary construction, are marketed.

On the inner face of one of the side plates and to one side of the center thereof is pivotally mounted the drag-arm $f$. This arm is curved, and its outer end, preferably extending beyond a vertical line passing through the axis of the reel at substantially right angles to a line connecting the axis and the pivot of the drag-arm, is faced with leather or other appropriate material that bears upon the concave face of the flange $h$ of the spool, whose axis is marked $h'$. The drag-arm is normally pressed away from the axis of the reel, Fig. 4, by spring $i$, wound around a post $j$ and having its free end engaging a pin $k$, projecting from the outer face of the drag, its opposite end being held by pin $l$, projecting from the face of the side plate. A plate-spring $m$, riveted upon the inner face of the side plate, bears with its free end against the back of that part of the drag-arm faced with leather or other material $g$. When the drag is in operative position, Fig. 4, pressure of this spring tends to force the surface $g$ against the concave face of the spool-flange $h$, the pressure being regulated by means of a screw $n$, passing through the side plate and bearing upon the spring. When the spool is revolved to take up line, friction of the spool-flange upon the surface $g$ will tend to carry the drag-arm toward the axis and permit free rotation. When, however, the reel is revolved in the reverse direction by strain upon the line, friction of the spool-flange upon the surface $g$ tends to carry the drag-arm outwardly, and friction between the leather or surface $g$ and the concave spool-flange imposes a drag or retardation upon the revolutions of the spool, the extent of which may be adjusted by manipulation of the screw $n$. The drag-arm is controlled in position by a rotatable block $p$, carried by a shaft extending through the side plate and having on its outer end a milled thumb-wheel $q$. Between the relatively flat end $r$ and a longer flat side face $s$ the block is made circular and provided with shoulders to coöperate with a stop-pin $t$, that limits its movement in either direction. The axis about which the block turns is so related to the pivot of the drag-arm and to the projecting heel thereof having the flat face that the short relatively flat face $r$ acts to hold the drag-arm out of action, as in Fig. 3, while when the block is rotated to bring its longer flat side $s$ against the flat edge $u$ of the arm the latter under the stress of spring $i$ is allowed to move into operative position, as in Fig. 4. Thus the drag is controlled by mere rotation of the thumb-wheel $q$.

The flanges of the spool are connected by a series of rods $v$, parallel with the axis $h'$, arranged concentrically about it, that serve to strengthen the spool and constitute a drum of sufficient diameter to afford quick take up of the line. The special construction of side plates with projecting ears enables me to locate the rods $e$ beyond their peripheries, so that the rods $v$ may be placed a substantial distance from the axis $h''$ and yet leave ample space for the wound-up line.

I claim as my invention—

1. A fishing-reel comprising the combination of sheet-metal side plates having laterally-projecting flanges, ears or lugs riveted to the side plates and projecting beyond their flange peripheries, rods interposed between the ears, and a spool whose flanges fit within the peripheral flanges of the side plates.

2. A fishing-reel comprising the combination of side plates, a spool having concave flanges, a drag-arm pivoted upon one of the side plates and adapted to work frictionally against the concave face of the contiguous spool-flange, a spring attached to such side plate and bearing upon the drag-arm, and a screw, passing through the side plate, for adjusting the pressure of the spring.

3. A fishing-reel comprising side plates, means for connecting them, a spool between the side plates having concave flanges, a drag-arm pivoted on one of the plates and adapted to move about an axis parallel with that of the spool, having a friction-surface on its outer end adapted to engage the adjacent concave flange near its periphery and having on the opposite side of the pivot a tailpiece; and a rotatable block engaging the tailpiece for moving the drag-arm about its pivot to cause it to engage the flange.

4. A fishing-reel comprising side plates, means for connecting them, a spool between the side plates having concave flanges, a drag-arm pivoted on one of the plates and adapted to move about an axis parallel to that of the spool and having a friction-surface on its outer end to engage the adjacent concave flange near its periphery and having on its inner end a tailpiece with a straight edge extending beyond its pivot, and a rotatable block having edges $r$, and $s$, working against said straight edge to adjust the drag-arm into and out of operative positions.

In testimony whereof I have hereunto subscribed my name.

JULIUS VOM HOFE.

Witnesses:
  THS. J. CONREY,
  ALBERT C. AUBERY.